UNITED STATES PATENT OFFICE.

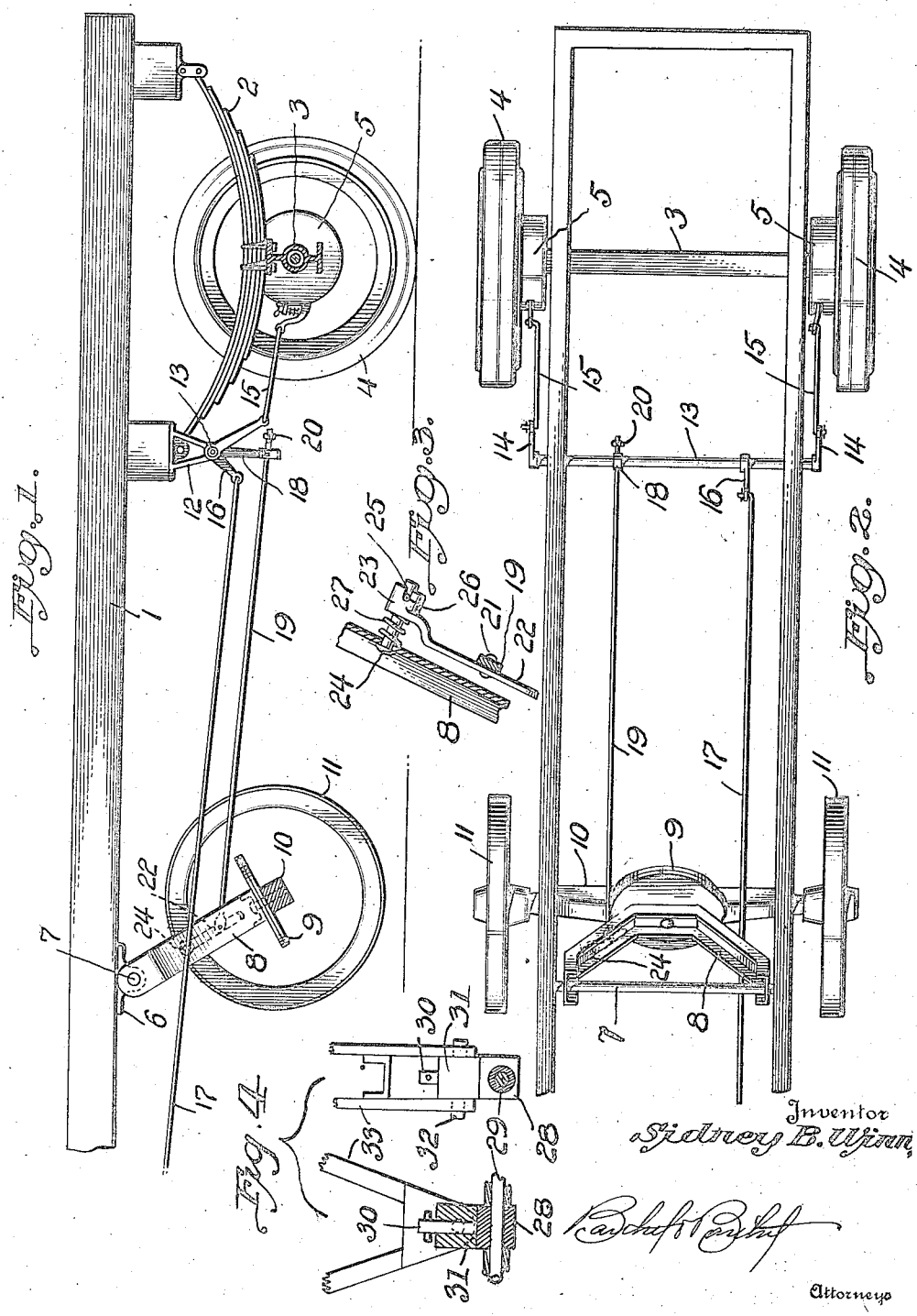

SIDNEY B. WINN, OF LAPEER, MICHIGAN, ASSIGNOR TO LAPEER TRACTOR TRUCK COMPANY, OF LAPEER, MICHIGAN, A CORPORATION OF MICHIGAN.

TRAILER.

1,346,927.  Specification of Letters Patent.  Patented July 20, 1920.

Application filed August 23, 1918. Serial No. 251,046.

*To all whom it may concern:*

Be it known that I, SIDNEY B. WINN, a citizen of the United States of America, residing at Lapeer, in the county of Lapeer and State of Michigan, have invented certain new and useful Improvements in Trailers, of which the following is a specification, reference being had therein to the accompanying drawings.

This invention relates to trailers for automobiles, and my invention aims to provide a single truck trailer with a rest member or support that may be raised or lowered, either to support one end of the trailer when not attached to a vehicle or to assume an inactive position when the trailer is attached to a vehicle. The truck trailer is also provided with a brake mechanism that may be actuated by the rest member, actuated from the vehicle to which the trailer is connected, or actuated independent of the vehicle and the rest member.

In pulling a loaded trailer, it is necessary that the brakes of the trailer can be controlled from the vehicle to which the trailer is attached, and it is equally necessary that the brakes of the trailer may be set or applied, when the trailer is not attached to a vehicle, so that it cannot be accidentally moved. Furthermore, it is necessary that some means be provided whereby the applied brakes of the trailer may be released so that the trailer may be moved about, without being attached to a tractor, truck or other vehicle. All of this is accomplished by a novel arrangement of parts that will be hereinafter described and then claimed.

Reference will now be had to the drawings, wherein—

Figure 1 is a longitudinal sectional view of a trailer in accordance with my invention;

Fig. 2 is a plan of the same;

Fig. 3 is a detail view of a brake releasing device, and

Fig. 4 shows views of a universal joint that will serve as a fifth wheel.

In the drawing, the reference numeral 1 denotes a portion of the conventional form of trailer frame which has the rear end thereof supported by springs 2 on an axle 3, said axle having the ends thereof provided with wheels 4 and brakes 5. The axle and its wheels constitute a single rear truck and the forward end of the trailer frame is adapted to be coupled to a tractor, truck or other vehicle so that the trailer may be moved, particularly when loaded.

Adjacent the forward end of the trailer frame 1 are bearings 6 for a transverse rock shaft 7 and mounted on said rock shaft is a rest or supporting member, comprising a substantially V-shaped frame 8 which has the lower end thereof provided with a fifth wheel 9 or a universal joint supporting an axle 10, and on the ends of the axle are wheels 11. The rest member, as shown, is in an inactive position, off of the ground and is maintained in such position while the trailer is attached to a vehicle. Any suitable means may be employed for holding the rest member in an inactive position and when said rest member is swung downwardly the wheels 11 are positioned above the ground so as to coöperate with the single truck in supporting the trailer immediately after the vehicle lowers and releases the forward end of the trailer.

The trailer frame 1, adjacent the single truck, has hangers 12, and in said hangers is a rock shaft 13. The ends of the rock shaft 13 are provided with cranks 14 connected by links 15 to the brakes 5, so that by rocking the shaft 13 the brakes may be released or applied.

The rock shaft 13, has a crank 16 and connected to said crank is a reach rod 17 that extends forwardly and may be actuated from the tractor, truck or vehicle, to which the trailer is attached.

The rock shaft 13 has an additional crank 18 and slidable in the lower end of said crank is a rod 19 having the rear end thereof provided with an adjustable head 20, preferably in the form of a nut, adapted to engage the crank 18 and actuate the rock shaft 13 when the rod 19 is shifted. The forward end of the rod is pivotally connected, as at 21 to a long crank or lever 22 that has a slotted head or sleeve 23 normally fixed on a stud 24, carried by the side of the frame 8. The head or sleeve 23, is slotted, as at 25, to receive the ends of a transverse pin 26 carried by the stud 24, and the head or sleeve 23 is normally held in engagement with the pin 26 by a coiled compression spring 27, encircling the stud 24, between the head 23 and the side of the frame 8. The crank or lever 22 is therefore normally fixed relative to the frame 8 to move therewith, but by shifting the crank or lever 22 toward the frame 8, the head or sleeve 23 is moved out of engagement with the pin 26 and said crank or lever is loose relative to the stud 24.

It is now apparent that the brakes 5 of the trailer may be released or applied from the vehicle to which the trailer is attached; that when the rest member is lowered the brakes 5 may be applied through the medium of the cranks 22 and 18, and rod 19, so that the trailer will not accidentally move particularly if left standing on a grade; and, that by releasing or unlocking the crank 22, the trailer may be manually moved about from place to place with the rest member coöperating with the rear truck of the trailer.

In Fig. 4 there is shown a universal joint that may be used as a fifth wheel, said joint comprising a member 28 fixed on an axle 29 and provided with a king bolt 30 for a swiveled block 31 having trunnions or gudgeons 32. The lower end of a rest member 33 can be placed on the trunnions 32, so that the axle 29 will have a universal movement relative to the trailer.

It is thought that the operation and utility of the trailer will be apparent without further description, and while in the drawing there are illustrated the preferred embodiments of my invention, it is to be understood that the structural elements are susceptible to such variations and modifications as fall within the scope of the appended claims.

What I claim is:—

1. In combination, a trailer of the single truck type, a movable rest member carried by the forward end of the trailer and adapted to move to and from a position to form a support for such end when the trailer is detached, and brake mechanism for the truck, said mechanism having connection with said rest member operative to apply the brakes when said member is placed in rest position, said mechanism also including means for applying such brakes at will while the rest member is out of such position.

2. In combination, a trailer of the single truck type, a movable rest member carried by the forward end of the trailer and adapted to move to and from a position to form a support for such end when the trailer is detached, and brake mechanism for the truck, said mechanism, including a rock shaft operatively connected to the brakes to control the operations of the latter, connections between the shaft and said rest member to apply the brakes when the member is in rest position, and independent connections leading to such shaft and operable at will for setting the brakes when the rest member is out of such position.

3. In combination, a trailer of the single truck type, a movable rest member carried by the forward end of the trailer and adapted to move to and from a position to form a support for such end when the trailer is detached, and brake mechanism for the truck, said mechanism having a connection with said rest member normally operative to apply the brakes when said member is in rest position, said mechanism including means operative to temporarily release the brakes when the member is in such position.

4. In combination, a trailer of the single truck type, a movable rest member carried by the forward end of the trailer and adapted to move to and from a position to form a support for such end when the trailer is detached, and brake mechanism for the truck, said mechanism including a crank normally having a fixed relation to and movable with the rest member and adapted to normally apply the brakes when said member is moved into rest position, and means for temporarily releasing the fixed relation of crank and member to permit relative movement therebetween.

5. The combination of a trailer having a single truck, and a pivoted rest member for the forward end of said trailer, said rest member comprising a frame, a fifth wheel at the lower end thereof, and an axle and wheels supported by said fifth wheel, said axle and wheels forming a unit in which the wheels are spaced a distance greater than the width of the trailer frame.

6. The combination of a trailer having a single truck, a pivoted rest member at the forward end of said trailer, an axle having universal movement at the lower end of said rest member, and revoluble wheels on said axle, said axle and wheels forming a unit in which the wheels are spaced a distance greater than the width of the trailer frame.

In testimony whereof I affix my signature in presence of two witnesses.

SIDNEY B. WINN.

Witnesses:
ANNA M. DORR,
CHAS. W. STAUFFIGER.